United States Patent
Hayakawa

(10) Patent No.: US 9,536,525 B2
(45) Date of Patent: Jan. 3, 2017

(54) SPEAKER INDEXING DEVICE AND SPEAKER INDEXING METHOD

(71) Applicant: FUJITSU LIMITED, Kawasaki-shi, Kanagawa (JP)

(72) Inventor: Shoji Hayakawa, Akashi (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/825,653

(22) Filed: Aug. 13, 2015

(65) Prior Publication Data

US 2016/0071520 A1    Mar. 10, 2016

(30) Foreign Application Priority Data

Sep. 9, 2014   (JP) ................................. 2014-183652

(51) Int. Cl.
- *G10L 17/00* (2013.01)
- *G10L 17/04* (2013.01)
- *G10L 17/02* (2013.01)

(52) U.S. Cl.
CPC ................ *G10L 17/04* (2013.01); *G10L 17/02* (2013.01)

(58) Field of Classification Search
CPC .......... G10L 17/00; G10L 17/02; G10L 17/04; G10L 17/20; G10L 17/22; G10L 17/26
USPC .................. 704/247, 246, 249, 250
See application file for complete search history.

(56) References Cited

U.S. PATENT DOCUMENTS

| | | | |
|---|---|---|---|
| 6,246,982 B1 * | 6/2001 | Beigi ...................... | G10L 15/10 704/238 |
| 6,434,520 B1 * | 8/2002 | Kanevsky ......... | G06F 17/30746 704/243 |
| 2004/0260550 A1 * | 12/2004 | Burges .................... | G10L 17/00 704/259 |
| 2007/0129946 A1 * | 6/2007 | Ma ........................ | G10L 13/027 704/256 |
| 2008/0215324 A1 | 9/2008 | Hirohata | |

(Continued)

FOREIGN PATENT DOCUMENTS

| JP | 06-110488 | 4/1994 |
|---|---|---|
| JP | 08-054891 | 2/1996 |

(Continued)

OTHER PUBLICATIONS

Corinne Fredouille et al.; "The LIA-EURECOM RT '09 Speaker Diarization System", NIST paper of "The Rich Transcription 2009 Meeting recognition evaluation workshop", 2009 (10 pages).

*Primary Examiner* — Qi Han
(74) *Attorney, Agent, or Firm* — Fujitsu Patent Center

(57) ABSTRACT

A speaker indexing device extracts a plurality of features from a speech signal on a frame-by-frame basis, models a distribution of first feature sets by a mixture distribution containing as many probability distributions as there are speakers, selects for each probability distribution either first feature sets located within a predetermined distance from the center of the probability distribution or a predetermined number of first feature sets in sequence starting from the first feature set closest to the center of the probability distribution, selects a second feature for the frame corresponding to the selected first feature sets as first training data for the speaker corresponding to the probability distribution and, using the first training data, trains a speaker model to be used to append to each frame identification information for identifying the speaker speaking in the frame.

13 Claims, 9 Drawing Sheets

(56) References Cited

U.S. PATENT DOCUMENTS

2011/0282666 A1 11/2011 Washio et al.
2013/0253931 A1* 9/2013 Shen .................. G10L 17/04
                                                        704/245

FOREIGN PATENT DOCUMENTS

| JP | 2005-321530 | 11/2005 |
| JP | 2008-175955 | 7/2008 |
| JP | 2011-242755 | 12/2011 |

* cited by examiner

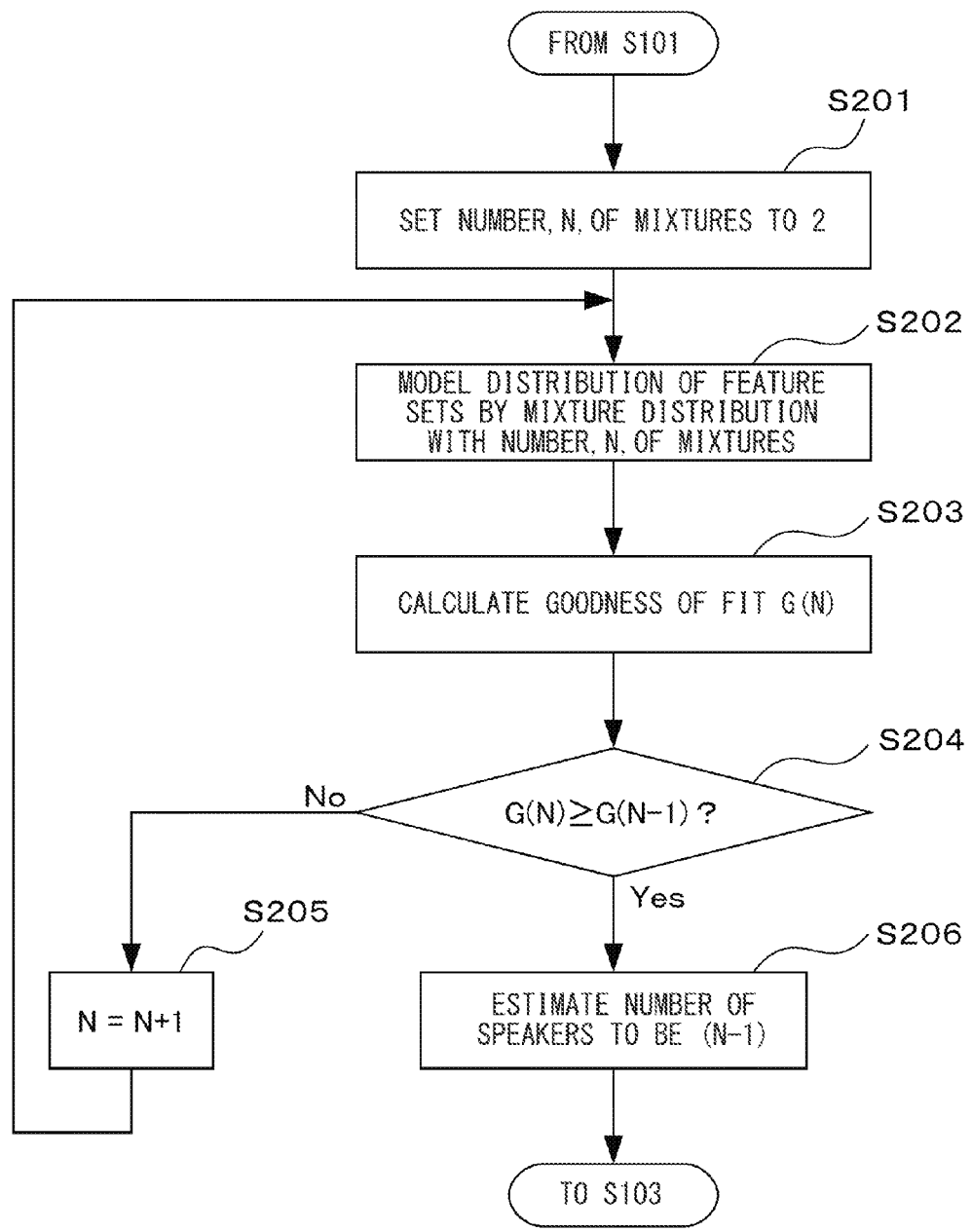

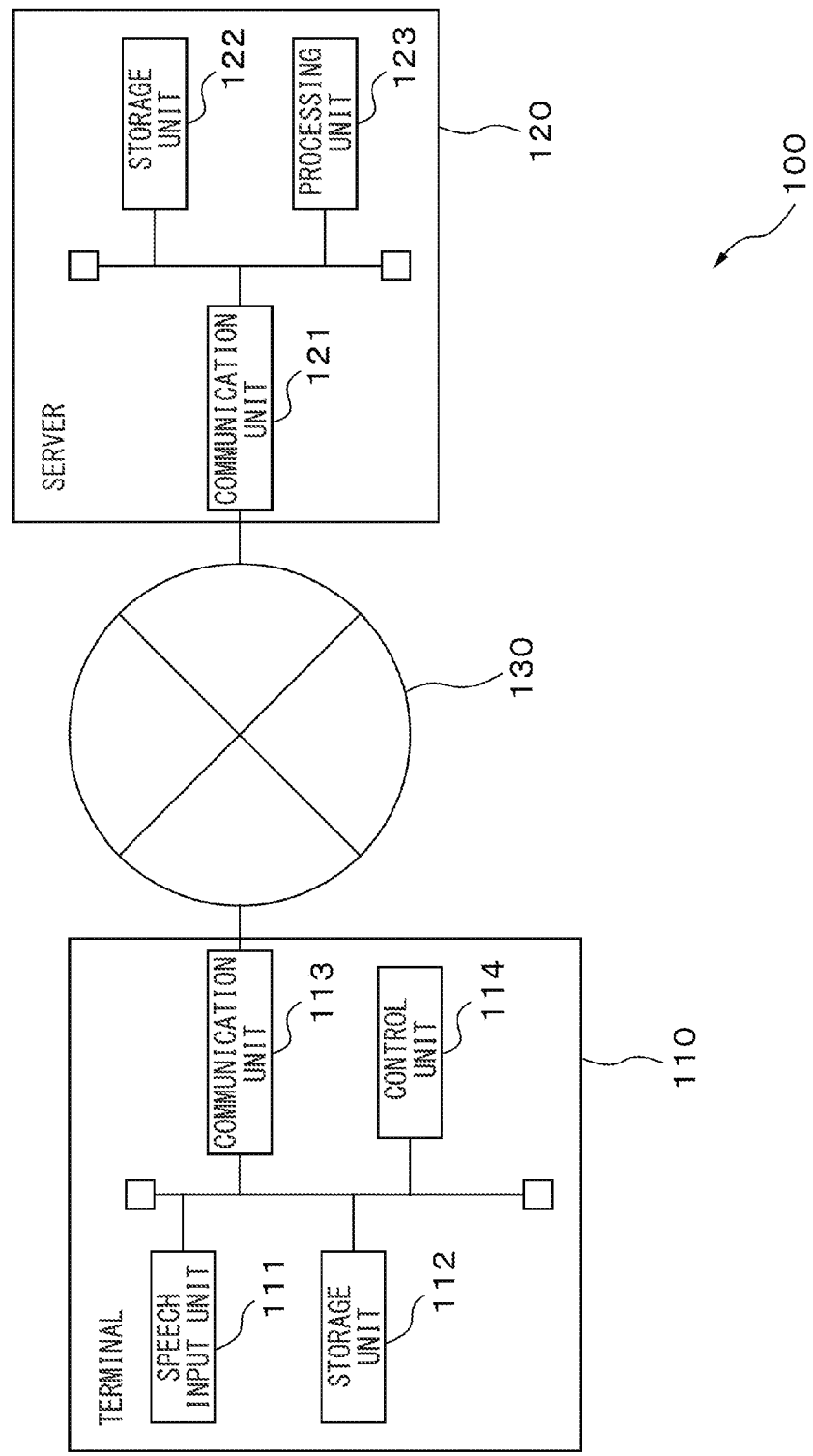

SPEAKER INDEXING DEVICE AND SPEAKER INDEXING METHOD

CROSS-REFERENCE TO RELATED APPLICATION

This application is based upon and claims the benefit of priority of the prior Japanese Patent Application No. 2014-183652, filed on Sep. 9, 2014, the entire contents of which are incorporated herein by reference.

FIELD

The embodiments discussed herein are related to a speaker indexing device, speaker indexing method, and speaker indexing computer program for appending identification information for identifying each speaker speaking in a speech signal produced by recording a conversation between a plurality of speakers.

BACKGROUND

In recent years, fraud and other malicious solicitations conducted using telephones with an aim to defraud people out of money have become a social problem. To address this, techniques have been proposed for estimating a speaker's state of mind by analyzing the speaker's voice produced, for example, during a conversation being conducted over a telephone line (For example, refer to Japanese Laid-open Patent Publication No. 2011-242755).

Such techniques work based on the premise that a speech signal containing speech uttered by one particular speaker whose state of mind is to be analyzed can be analyzed. However, a speech signal produced by recording a conversation contains speech from two or more speakers. In order to estimate the state of mind of one particular speaker with good accuracy based on a speech signal produced by recording a conversation, there is a need to identify from within the speech signal a speech segment in which the speaker whose state of mind is to be estimated is speaking. In view of this, speaker indexing techniques are proposed that can append speaker identification information to the speech segment of each speaker in a monaural speech signal containing speech from a plurality of speakers (refer, for example, to Japanese Laid-open Patent Publication No. 2008-175955 and to Fredouille et al., "The LIA-EURECOM RT'09 Speaker Diarization System", NIST paper of "The rich transcription 2009 Meeting recognition evaluation workshop", 2009 (hereinafter referred to as non-patent document 1)).

For example, the indexing device disclosed in Japanese Laid-open Patent Publication No. 2008-175955 computes the degree of similarity between acoustic models created from speech features extracted at predetermined intervals of time, and creates acoustic models from the speech features within a range where the degree of similarity is equal to or greater than a predetermined value. Then, the indexing device, using the acoustic models and the speech features within the range, derives a feature vector that characterizes the speech signal for each second segment, and classifies such feature vectors on a speaker-by-speaker basis.

On the other hand, the speaker diarization system disclosed in non-patent document 1 first trains a Gaussian mixture model by using a single state hidden Markov model (HMM) for every speech segment contained in a speech signal. Then, the system repeats the speaker labeling and retraining for each speech segment by adding to the state of the HMM trained by using the features of the speech segment in which the same speaker is highly likely to be speaking.

SUMMARY

In the techniques disclosed in Japanese Laid-open Patent Publication No. 2008-175955 and non-patent document 1, a long segment in which the same speaker is presumed to be speaking, for example, a segment lasting for several to ten seconds, is referred to in order to create an initial speaker model which represents the speech features of each speaker by a probability distribution of human speech features. In other words, these techniques work on the premise that there exists segments in which the same speaker is speaking for a prolonged period of time. However, in the case of a speech signal produced, for example, by recording a high-paced conversion in which the speakers change frequently, there may not exist any segments in which the same speaker is speaking for a prolonged period of time. It is not possible to apply the techniques as above described to such speech signals.

According to one embodiment, a speaker indexing device is provided. The speaker indexing device including a processor configured to, from a speech signal containing a conversation between a plurality of speakers, extract a plurality of features representing human speech features on a frame-by-frame basis, each frame having a predetermined time length; model a distribution of first feature sets that contain at least two of the plurality of features, by a mixture distribution that contains as many probability distributions as the number of speakers; for each of the probability distributions, select from among the first feature sets, either first feature sets located within a predetermined distance from the center of the probability distribution or a predetermined number of first feature sets in sequence starting from the first feature set closest to the center of the probability distribution, and select, from the plurality of features extracted for the frame corresponding to the selected first feature sets, at least one second feature as first training data for speaker of the plurality of speakers that corresponds to the probability distribution; train a speaker model for each of the plurality of speakers by using the first training data selected for the corresponding speaker, the speaker model representing the speech features of the speaker by a probability distribution of the second feature; and based on the speaker model of each of the plurality of speakers and on the second feature selected for each frame, append to each frame identification information for identifying the speaker speaking in the frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is an operation flowchart of a number-of-speakers estimating process.

FIG. 10 is a diagram schematically illustrating the configuration of a server/client system incorporating the speaker indexing device according to any one of the embodiments or their modified examples.

DESCRIPTION OF EMBODIMENTS

A speaker indexing device will be described below with reference to the drawings. According to the speaker indexing device, a speech signal produced by recording a conversation being conducted among a plurality of speakers is divided into frames, and a plurality of features representing human speech features are extracted from each frame. The speaker indexing device models the distribution of the features by a mixture model having as many mixtures as there are speakers. The speaker indexing device selects features located within a predetermined distance from the center of each probability distribution contained in the mixture distribution. Then, for each probability distribution, the speaker indexing device trains, by using the features in the frame selected for the probability distribution, an initial speaker model representing the speech features of the corresponding speaker by the probability distribution of the features. Using the initial speaker model, the speaker indexing device repeats for each frame the training of the speaker model and the appending of identification information for identifying the speaker corresponding to the frame.

Figure 1:
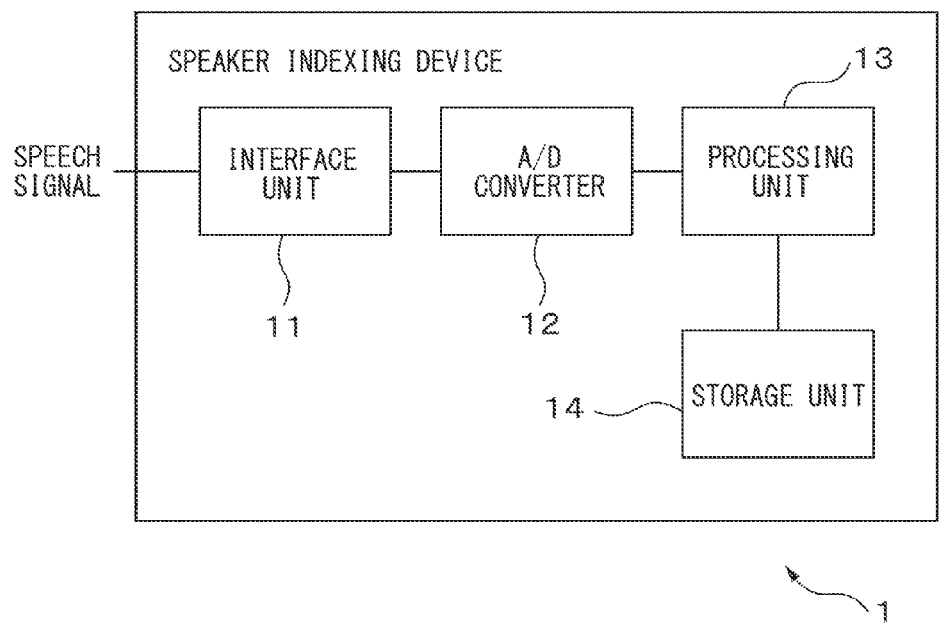
FIG. 1 is a diagram schematically illustrating the configuration of a speaker indexing device according to a first embodiment.

FIG. 1 is a diagram schematically illustrating the configuration of a speaker indexing device according to a first embodiment. The speaker indexing device 1 includes an interface unit 11, an analog/digital converter 12, a processing unit 13, and a storage unit 14.

The interface unit 11 is one example of a speech input unit, and includes an audio interface. The interface unit 11 acquires, for example, from a voice communication recording adapter (not depicted) connected to a telephone line, a monaural speech signal, i.e., an analog speech signal, that contains conversational speech being conducted between a speaker at the transmitting end and a speaker at the receiving end. Then, the interface unit 11 passes the speech signal to the analog/digital converter 12 (hereinafter referred to as the A/D converter). The A/D converter 12 digitizes the speech signal by sampling the analog speech signal at a predetermined sampling rate. The A/D converter 12 passes the digitized speech signal to the processing unit 13.

The processing unit 13 includes, for example, one or a plurality of processors, a memory circuit, and a peripheral circuit. The processing unit 13 performs speaker indexing, and appends, based on the digitized speech signal, identification information for identifying the speaker speaking in each particular frame. The speaker indexing process to be performed by the processing unit 13 will be described in detail later.

The storage unit 14 includes, for example, a readable/writable nonvolatile semiconductor memory and a readable/writable volatile semiconductor memory. The storage unit 14 stores various kinds of data to be used in the speaker indexing process performed by the processing unit 13 and various kinds of data generated during the speaker indexing process. The storage unit 14 also stores the speech signal to which the speaker identification information has been appended as a result of the speaker indexing process performed by the processing unit 13.

The speaker indexing process to be performed by the processing unit 13 will be described in detail below. In the present embodiment, the number of speakers participating in the conversation recorded in the digitized speech signal is assumed to be two.

Figure 2:
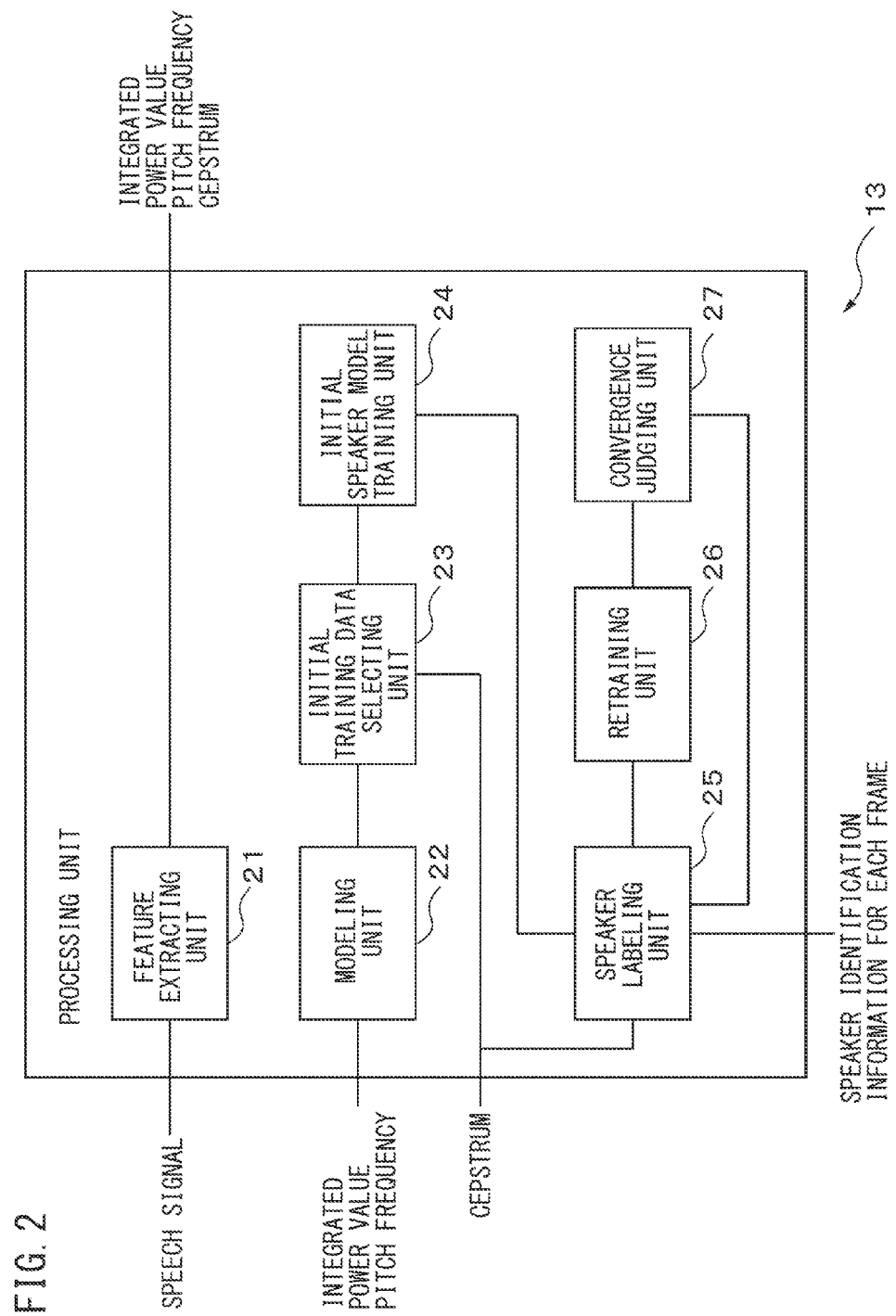
FIG. 2 is a functional block diagram of a processing unit contained in the speaker indexing device.

FIG. 2 is a functional block diagram of the processing unit 13. The processing unit 13 includes a feature extracting unit 21, a modeling unit 22, an initial training data selecting unit 23, an initial speaker model training unit 24, a speaker labeling unit 25, a retraining unit 26, and a convergence judging unit 27. These units constituting the processing unit 13 are functional modules implemented, for example, by executing a computer program on a processor contained in the processing unit 13.

The feature extracting unit 21 divides the digitized speech signal (hereinafter simply referred to as the speech signal) into frames each having a predetermined length, and extracts from each frame a plurality of features representing human speech features. In the present embodiment, the frame length is, for example, 32 msec. In this case, if the sampling rate of the A/D converter 12 is 8 kHz, there are 256 sample points per frame.

In the present embodiment, the feature extracting unit 21 extracts, as the features representing human speech features, the integrated value of power and the pitch frequency as prosodic information representing prosody, and cepstrum as spectral envelope information representing the resonant characteristics of a speaker's vocal tract.

The feature extracting unit 21 extracts the integrated value of power on a frame-by-frame basis in accordance, for example, with the following equation.

$$P = 10\log_{10}\left\{\sum_{n=1}^{N} s(n)^2\right\} \quad (1)$$

where s(n) represents the signal taken at the n-th sample point contained in the frame. N represents the number of sample points contained in one frame. P is the integrated value of power expressed in logarithmic form.

Further, in order to calculate the pitch frequency, the feature extracting unit 21 obtains the largest value among the peak values (excluding peak values with zero time difference) of an autocorrelation function or modified autocorrelation function for each frame. For any frame corresponding to a human's voiced sound, the degree of autocorrelation is relatively high, on the other hand, for any frame corresponding to an unvoiced sound or background noise, the degree of autocorrelation is low. Therefore, the feature extracting unit 21 compares the largest peak value with a predetermined threshold value and, if the largest value is larger than the predetermined threshold value, then determines that the frame contains a voiced sound of the speaker. Then, the feature extracting unit 21 calculates the pitch frequency by taking the reciprocal of the time difference corresponding to the largest peak value.

The feature extracting unit 21 may obtain the autocorrelation function and modified autocorrelation function, based on a spectral signal in the frequency domain obtained by time-to-frequency transforming the speech signal on a frame-by-frame basis. In this case, the autocorrelation function is obtained by inverse Fourier transforming the power spectrum of each frequency. On the other hand, the modified autocorrelation function is obtained by first applying linear predictive coding filtering to the power spectrum and then inverse Fourier transforming the result of the filtering. The feature extracting unit 21 may use, for example, a fast Fourier transform (FFT) as the time-to-frequency transform.

Further, the feature extracting unit 21 calculates the cepstrum from the speech signal for each frame. The feature extracting unit 21 may use, as the cepstrum, either the FFT cepstrum which is derived by calculating the logarithm of each frequency value of the power spectrum and by selecting low-order values when the frequency values are inverse Fourier transformed, or the LPC cepstrum which is derived from linear prediction coefficients obtained by linear prediction analysis. Alternatively, the feature extracting unit 21 may use, as the cepstrum, Mel Frequency Cepstral Coefficients (MFCCs) which are calculated by applying a discrete cosine transform (DCT) to the logarithm of the outputs of a filter bank whose center frequencies are arranged at equally spaced intervals on the Mel scale. The feature extracting unit 21 may use the coefficients of predetermined orders (for example, first to 12th orders) of the calculated cepstrum as the features.

The feature extracting unit 21 stores the pitch frequency, integrated power value, and cepstrum for each frame as a set of features in the storage unit 14.

The feature extracting unit 21 may obtain a normalized pitch frequency as a feature by dividing the pitch frequency by a predetermined value. Similarly, the feature extracting unit 21 may obtain a normalized integrated power value as a feature by dividing the integrated power value by a predetermined value. Further, the feature extracting unit 21 may compare the integrated power value with a noise judging threshold value Thn representing the noise component contained in the frame and may store the set of features in the storage unit 14 only when the integrated power value for the frame is larger than the noise judging threshold value Thn. In that case, the processing unit 13 can prevent the set of features extracted from any frame in which neither speaker is speaking from affecting the speaking indexing.

It is preferable that the noise judging threshold value Thn is set adaptively according to the background noise level of the conversational speech. Then, the feature extracting unit 21 judges any frame in which neither speaker is speaking as being a silent frame that contains only background noise. For example, if the integrated value of power spectrum is smaller than a predetermined power threshold value, the feature extracting unit 21 judges the frame to be a silent frame. Then, the feature extracting unit 21 estimates the background noise level based on the integrated power value of the silent frame. For example, the feature extracting unit 21 estimates the background noise level in accordance with the following equation.

$$\text{noise}P' = 0.01 \cdot Ps + 0.99 \cdot \text{noise}P \quad (2)$$

where Ps is the integrated power value of the most recent silent frame, and noiseP is the background noise level before updating. Then, noiseP' is the background noise level after updating. In this case, the noise judging threshold value Thn is set, for example, in accordance with the following equation.

$$Thn = \text{noise}P + \gamma \quad (3)$$

where $\gamma$ is a preset constant which is set, for example, to 3 to 10 [dB].

When the speech signal for speaker indexing ends, the modeling unit 22 models the distribution of feature sets, each including the integrated power value and the pitch frequency, by a mixture model having as many mixtures as there are speakers, i.e., by a mixture model containing as many probability distributions as there are speakers. Since different speakers have different speech features, it is presumed that the feature sets extracted from frames in which the same speaker is speaking have relatively similar values. Accordingly, it is considered that each probability distribution represents the speech features of a different speaker. Then, it is presumed that the closer the feature set is to the center of the probability distribution, the more likely it is that the feature set represents the typical speech features of the speaker corresponding to that probability distribution.

In the present embodiment, a two-dimensional, two-mixture Gaussian mixture distribution, with the two dimensions being the pitch frequency and the integrated power value, respectively, is used as the mixture distribution. The two-mixture Gaussian mixture distribution is one form of a normal mixture distribution, and the likelihood of the normal mixture distribution for the vector x of the set of input features is expressed by the following equation.

$$f(x; w, \mu, \Sigma) = \sum_{i=1}^{2} \frac{w_i}{2\pi |\Sigma_i|} \exp\left(-\frac{1}{2}(x - \mu_i)^t \Sigma_i^{-1}(x - \mu_i)\right) \quad (4)$$

where $w_i$ (i=1,2) is a weighting factor for Gaussian distribution i. Further, $\mu_i$ is the mean vector of the set of features with Gaussian distribution i. $\Sigma_i$ is the covariance matrix for Gaussian distribution i.

Using as training samples the set of features of the pitch frequency and integrated power value obtained from each frame, the modeling unit 22 calculates maximum likelihood estimates of a plurality of parameters describing each Gaussian distribution contained in the two-mixture Gaussian mixture distribution. For this purpose, the modeling unit 22 uses, for example, an EM (Expectation Maximization) algorithm. For example, the modeling unit 22 obtains the maximum likelihood estimates of the weighting factor $w_i$, the mean vector $\mu_i$, and the covariance matrix $\Sigma_i$ for each of the Gaussian distributions contained in the two-mixture Gaussian mixture distribution.

The modeling unit 22 may use a log-normal distribution as the probability distribution to be used for modeling the distribution of the features. In this case also, the modeling unit 22 obtains, using the EM algorithm, the maximum likelihood estimates of the weighting factor, the mean vector, and the covariance matrix for each log-normal distribution contained in the log-normal mixture distribution which contains as many log-normal distributions as there are speakers.

Instead of the EM algorithm, the modeling unit 22 may use a Markov chain Monte Carlo method or a simulated annealing method as the algorithm for obtaining the probability distribution to be used for modeling the distribution of the features.

The modeling unit 22 notifies the initial training data selecting unit 23 of the maximum likelihood estimates of the weighting factor $w_i$, the mean vector $\mu_i$, and the covariance matrix $\Sigma_i$ calculated for each probability distribution modeling the distribution of the features and representing the two-mixture Gaussian mixture distribution.

The initial training data selecting unit 23 is one example of a training data selecting unit, and selects initial training data for the initial speaker model training unit 24 to train an initial speaker model. As previously described, it is presumed that the closer the feature set is to the center of the probability distribution, the more likely it is that the feature set represents the typical speech features of the speaker corresponding to that probability distribution. In view of this, the initial training data selecting unit 23 selects feature sets located within a predetermined Mahalanobis' generalized distance from the center of each probability distribution contained in the mixture distribution obtained by the modeling unit 22. The Mahalanobis' generalized distance is calculated as $(x-\mu_i)'\Sigma_i^{-1}(x-\mu_i)$. Alternatively, the initial training data selecting unit 23 may select a predetermined number (for example, 100 to 300) of feature sets in sequence starting from the one closest to the center of each probability distribution.

The initial training data selecting unit 23 reads the memory 14 to retrieve, for each probability distribution, the cepstrum which is another feature of the frame corresponding to the selected feature set, as the initial training data for the speaker corresponding to the probability distribution, and passes it to the initial speaker model training unit 24. When the set of features used for the training of the speaker model is thus made different from the set of features used for modeling for the selection of the initial training data, the processing unit 13 can obtain a more appropriate speaker model because a larger number of features can be used.

The predetermined distance is set equal to a distance within which any selected feature set is highly likely to correspond to either one of the speakers. For example, the predetermined distance is set so that feature sets whose cumulative probability is 10% or less are selected in sequence starting from the one closest to the center of the probability distribution. The Mahalanobis' generalized distance from the center of the Gaussian distribution obeys a $\chi$-squared distribution with degrees of freedom equal to the number of features (in this example, two) contained in the feature set used in the Gaussian distribution. Therefore, in this example, the Mahalanobis' generalized distance corresponding to 10% as counted starting from the distance closest to the center of the probability distribution is obtained in accordance with the $\chi$-squared distribution with two degrees of freedom.

Figure 3:
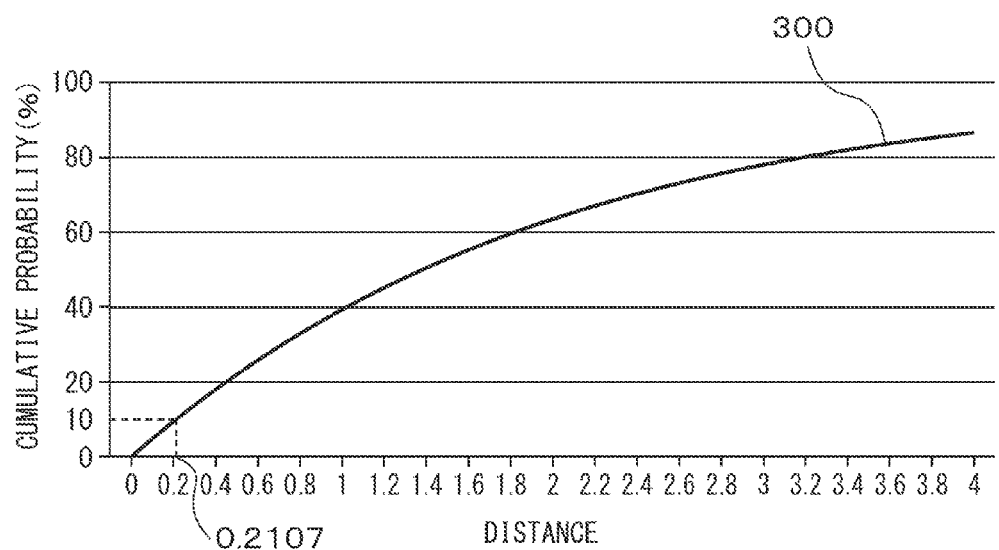
FIG. 3 is a diagram of a χ-squared distribution with two degrees of freedom, which illustrates the relationship between Mahalanobis' generalized distance and cumulative probability.

FIG. 3 is a diagram of the $\chi$-squared distribution with two degrees of freedom, which illustrates the relationship between the Mahalanobis' generalized distance and the cumulative probability. In FIG. 3, the Mahalanobis' generalized distance is plotted along the abscissa and the cumulative probability along the ordinate. The $\chi$-squared distribution 300 with two degrees of freedom illustrates the relationship between the Mahalanobis' generalized distance and the cumulative probability. According to the $\chi$-squared distribution 300 illustrated here, when the cumulative probability is 10%, the Mahalanobis' generalized distance is 0.2107.

Figure 4:
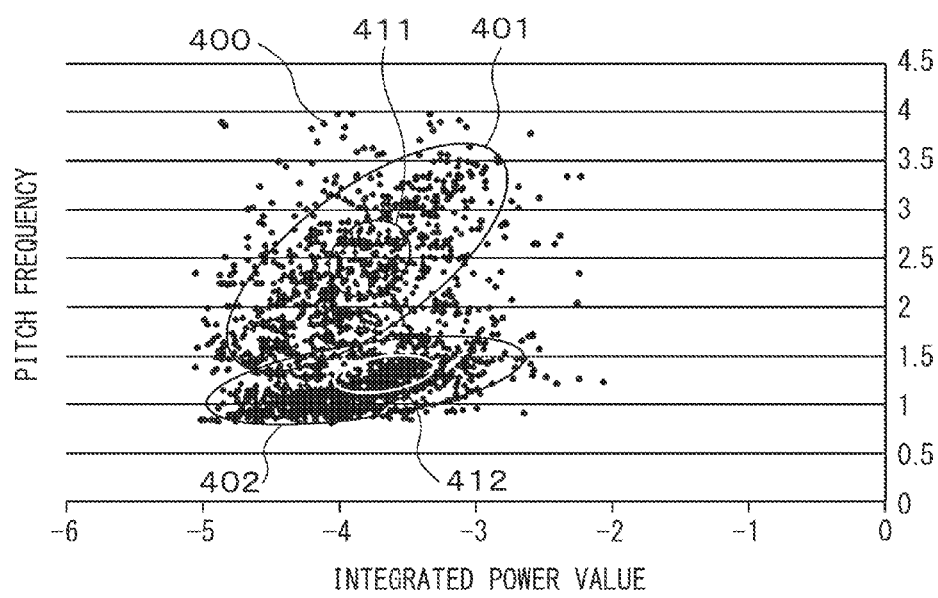
FIG. 4 is a diagram illustrating one example of the relationship between the distribution of feature sets used for training a probability distribution and the range of features to be selected.

FIG. 4 is a diagram illustrating one example of the relationship between the distribution of feature sets used for training the probability distribution and the range of features to be selected. In FIG. 4, the integrated power value is plotted along the abscissa (the value is indicated by dividing the integrated power value by 10 in order to match the order to that of the ordinate) and the pitch frequency along the ordinate (the value is indicated by dividing the pitch frequency by 100 in order to match the order to that of the abscissa). Each individual dot 400 indicates one feature set. Suppose that a probability distribution 401 corresponding to one speaker and a probability distribution 402 corresponding to the other speaker have been obtained by the modeling unit 22. An initial training data selection range 411 for the probability distribution 401 is set within a portion near the center of the probability distribution 401. Likewise, an initial training data selection range 412 for the probability distribution 402 is set within a portion near the center of the probability distribution 402. Since the selection range 411 and the selection range 412 do not overlap each other, it is highly likely that the feature sets contained in the selection range 411 were extracted from a frame in which the speaker corresponding to the probability distribution 401 was speaking. Likewise, it is highly likely that the feature sets contained in the selection range 412 were extracted from a frame in which the speaker corresponding to the probability distribution 402 was speaking. Accordingly, it is expected that by training the initial speaker model for the speaker corresponding to the probability distribution 401 by using the cepstrum of the frame corresponding to the feature sets contained in the selection range 411, the initial speaker model can be made to represent the speech features of that speaker fairly accurately. Likewise, it is expected that by training the initial speaker model for the speaker corresponding to the probability distribution 402 by using the cepstrum of the frame corresponding to the feature sets contained in the selection range 412, the initial speaker model can be made to represent the speech features of that speaker fairly accurately. The more accurate the initial speaker model is, the more likely it is that the eventually obtained speaker model is also accurate. Accordingly, the higher the accuracy of the initial speaker model, the higher is the accuracy with which speaker identification information can be appended to each frame.

Depending on the shape of one or the other or both of the probability distributions, one or more feature sets may be located within the predetermined distance from the centers of the two probability distributions. In such cases, since the same feature set is selected for both probability distributions, the accuracy of the initial speaker model to be described later may degrade. To address this, according to a modified example, the initial training data selecting unit 23 may adaptively set the distance within which to select feature sets, i.e., the distance from the center of each probability distribution. For example, if there is any feature set whose distance from the center of each of the probability distributions is within the initially set predetermined distance, the initial training data selecting unit 23 takes the distance from the center of each of the two probability distributions to the feature set as the predetermined distance. The initial training data selecting unit 23 thus changes the predetermined distance by repeating the above process until there is no longer any feature set selected for both the probability distributions. In this modified example, the predetermined distance is set for each probability distribution because the distance from the center of the probability distribution to the feature set is different for each probability distribution. In other words, for each probability distribution, the Mahalanobis' generalized distance from the center of the probability distribution to the feature set is taken as the predetermined distance.

The initial speaker model training unit 24 trains the initial speaker model by using the cepstrum, i.e., the selected training data, for each probability distribution, i.e., for each speaker. The initial speaker model is an initially set speaker model and represents the speech features of the speaker by the probability distribution of the features. In the present embodiment, the initial speaker model training unit 24 uses, for example, a Gaussian mixture distribution with eight mixtures as the initial speaker model for each speaker. Some other suitable probability model may be used as the initial speaker model. Then, for each speaker, the initial speaker model training unit 24 obtains, using the EM algorithm, the maximum likelihood estimates of the weighting factor $w_i$, the mean vector $\mu_i$, and the covariance matrix $\Sigma_i$ for each Gaussian distribution contained in the Gaussian mixture distribution by using the initial training data for the speaker. Then, the initial speaker model training unit 24 stores the maximum likelihood estimates of the weighting factor $w_i$, the mean vector $\mu_i$, and the covariance matrix $\Sigma_i$ for each Gaussian distribution, i.e., the parameters describing the Gaussian mixture distribution for each speaker, in the storage unit 14.

The speaker labeling unit 25 constructs an ergodic HMM with as many states as there are speakers, by appending "state transition probability" which is a probability of transitioning between states, by regarding each of the most recent speaker models as one state. Then, based on the constructed HMM and the features for each frame, the speaker labeling unit 25 appends to each frame the identification information for identifying the speaker speaking in the frame. When appending the speaker identification information for the first time, the speaker labeling unit 25 uses the initial speaker model as the most recent speaker model for each speaker, and when appending the speaker identification information for the second and subsequent times, it uses the speaker model updated by the retraining unit 26.

In the present embodiment, the speaker labeling unit 25 estimates the speaker on a frame-by-frame basis by using an ergodic HMM with as many states as there are speakers. In the present embodiment, the speaker labeling unit 25 uses a Viterbi algorithm based on a two-state ergodic HMM. For example, starting from the first frame, the speaker labeling unit 25 enters the cepstrum, one of the features obtained from each frame, as a feature vector x into the Gaussian mixture distribution in each state of the HMM corresponding to the speaker model, and obtains for each state the probability that the frame contains vocal utterance made by the speaker corresponding to the state (the output probability of the feature vector x). Then, the speaker labeling unit 25 performs dynamic programming (DP) until reaching the final frame; the DP is a process which sequentially selects a state transition to a state that yields the larger sum of the logarithm of the probability of transitioning from the previous state to the current state (the state transition probability), the logarithm of the output probability of the feature vector x in the current state, and the cumulative logarithmic likelihood in the previous state. The speaker labeling unit 25 then selects the state that yields the higher cumulative logarithmic likelihood in the final frame, obtains the history (DP path) of state transitions made until reaching the state by backtracking, and appends speaker identification information on a frame-by-frame basis by using the history of state transitions that corresponds to the result of the speaker identification. The above process may be skipped for any frame from which no features have been extracted. The speaker labeling unit 25 stores the speaker identification information for each frame in the storage unit 14.

Figure 5:
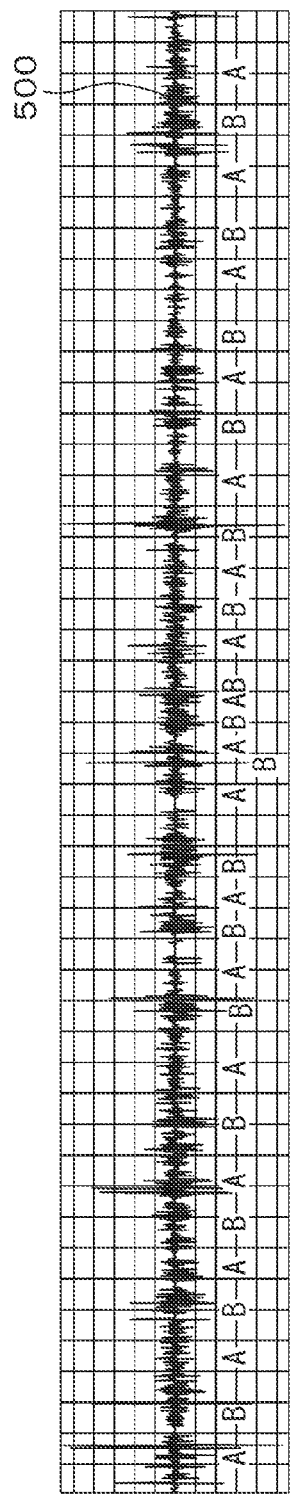
FIG. 5 is a diagram illustrating one example of identification information appended on a frame-by-frame basis.

FIG. 5 is a diagram illustrating one example of identification information appended on a frame-by-frame basis. In FIG. 5, the abscissa represents the time. Symbols "A" and "B" each represent speaker identification information. Symbol "A" is attached to any frame that is estimated to contain vocal utterance made by speaker A, and symbol "B" is attached to any frame that is estimated to contain vocal utterance made by speaker B for the speech signal 500.

The retraining unit 26 updates the speaker model for each speaker by retraining the speaker model for the corresponding speaker by using as the training data the feature (in the present embodiment, the cepstrum) extracted from each frame to which the identification information of that speaker is appended. Like the initial speaker model training unit 24, the retraining unit 26 may use an EM algorithm as the algorithm for the model training. Further, the speaker model to be retrained is represented, for example, by a Gaussian mixture distribution with eight mixtures, as in the case of the initial speaker model. Then, the retraining unit 26 stores the maximum likelihood estimates of the weighting factor $w_i$, the mean vector $\mu_i$, and the covariance matrix $\Sigma_i$ for each Gaussian distribution, i.e., the parameters describing the Gaussian mixture distribution for each speaker, in the storage unit 14. If the training of the speaker model has not converged yet, the updated speaker model is again used when appending the speaker identification information to each frame by the speaker labeling unit 25.

The convergence judging unit 27 determines whether the training of the speaker model has converged or not. In the present embodiment, the convergence judging unit 27 calculates the number of frames for which the speaker identification information appended to each frame based on the most recently updated speaker model differs from the speaker identification information appended to each frame based on the previously updated speaker model, and compares the calculated number of frames with a predetermined threshold value. If the calculated number of frames is not larger than the predetermined threshold value, the convergence judging unit 27 determines that the training of the speaker model has converged. The predetermined threshold value is set equal, for example, to 0.01% to 1% of the total number of frames contained in the speech signal, or to a fixed value of 1 to 10.

Alternatively, the convergence judging unit 27 may determine that the training of the speaker model has converged when the speaker model has been trained by the retraining unit 26 a predetermined number of times. In this case, the predetermined number of times is set, for example, to 100. Further alternatively, the convergence judging unit 27 may determine that the training of the speaker model has converged when the number of frames for which the identification information differs between the most recently updated speaker model and the previously updated speaker model has decreased to or below the predetermined threshold value or when the speaker model has been trained the predetermined number of times, whichever occurs first.

The speaker identification information appended to each frame based on the most recently updated speaker model when the convergence judging unit 27 determines that the training has ended is the final result of the speaker indexing. Using the result of the speaker indexing, the processing unit 13 may estimate from the speech signal the state of mind of any one of the speakers participating in the conversation recorded in the speech signal. In this case, since the speaker is identified on a frame-by-frame basis, the processing unit 13 can use various techniques that estimate the state of mind of any particular speaker by analyzing the speech signal containing vocal utterance made by the particular speaker.

Figure 6:
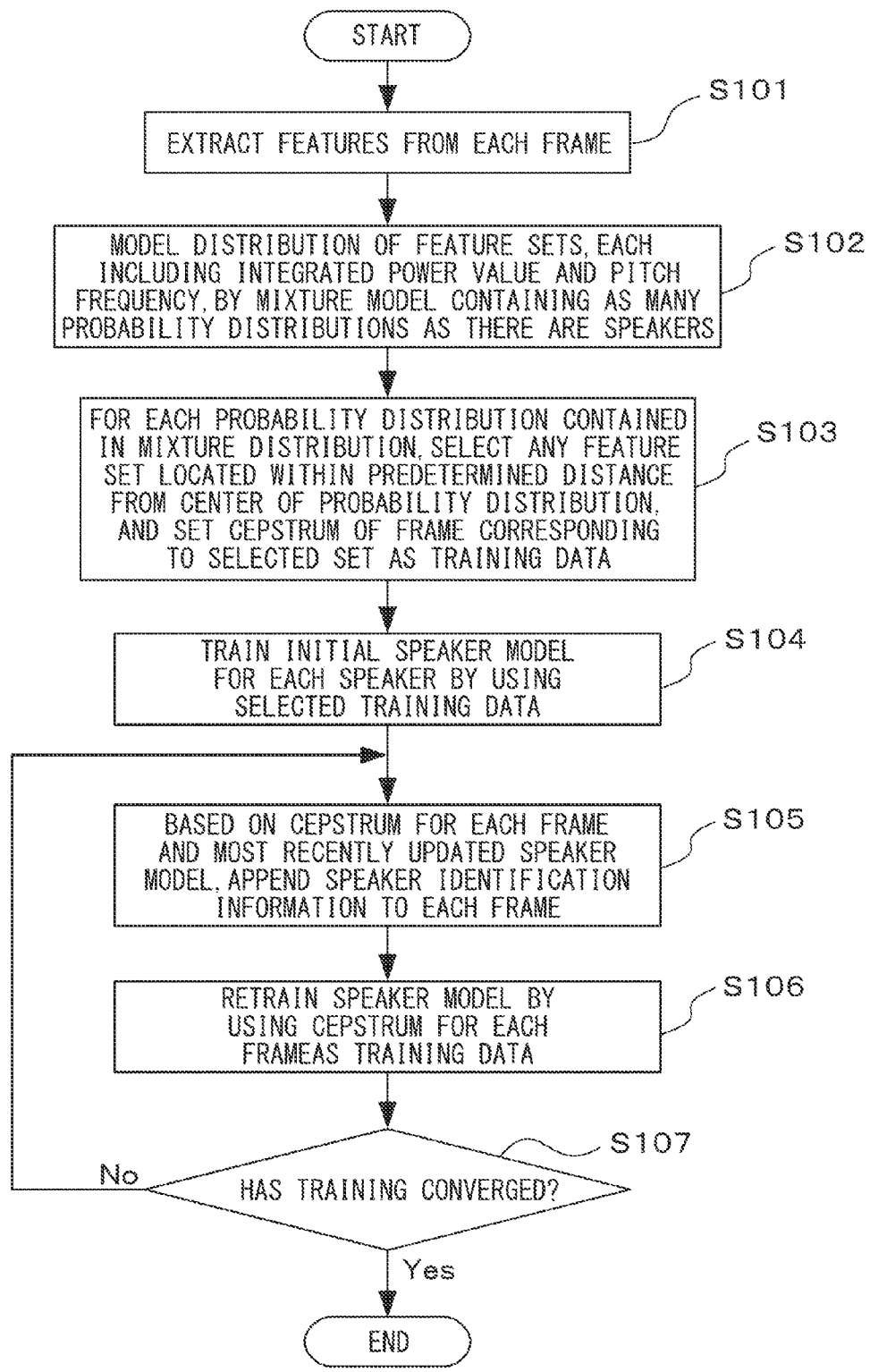
FIG. 6 is an operation flowchart of a speaker indexing process according to the first embodiment.

FIG. 6 is an operation flowchart of the speaker indexing process according to the present embodiment. The feature extracting unit 21 divides the speech signal containing conversational speech from a plurality of speakers into frames, and extracts features representing human speech features from each frame (step S101). In the present embodiment, integrated power value, pitch frequency, and cepstrum are extracted as the features. Then, the feature extracting unit 21 stores the set of features for each frame in the storage unit 14.

When the features have been extracted from each frame, the modeling unit 22 models the distribution of feature sets, each including the integrated power value and the pitch frequency, by a mixture model containing as many probability distributions as there are speakers (S102). Then, for each probability distribution contained in the mixture distribution, the initial training data selecting unit 23 selects any feature set located within a predetermined Mahalanobis' generalized distance from the center of the probability distribution as the feature set for one particular speaker. Then, the initial training data selecting unit 23 reads the storage unit 14 to retrieve the cepstrum of the frame corresponding to the selected set as the initial training data, and passes it to the initial speaker model training unit 24 (step S103).

The initial speaker model training unit 24 trains the initial speaker model for each speaker by using the initial training data of the frame selected for the speaker (step S104). Then, the initial speaker model training unit 24 stores the parameters describing the initial speaker model for each speaker in the storage unit 14.

Then, based on the feature (cepstrum) for each frame and the most recently updated speaker model for each speaker, the speaker labeling unit 25 appends to each frame the identification information for identifying the speaker speaking in the frame (step S105). Then, the speaker labeling unit 25 stores the speaker identification information for each frame in the storage unit 14. The retraining unit 26 updates the speaker model for each speaker by retraining the speaker model for the corresponding speaker by using as the training data the feature (cepstrum) extracted from each frame to which the identification information of the speaker is appended (step S106). Then, the retraining unit 26 stores the parameters describing the speaker model for each speaker in the storage unit 14.

The convergence judging unit 27 determines whether the training of the speaker model for each speaker has converged or not (step S107). If the training has not converged yet (No in step S107), the processing unit 13 repeats the process starting from step S105. On the other hand, when the training has converged (Yes in step S107), the processing unit 13 terminates the speaker indexing process by determining that the speaker identification information appended to each frame based on the most recently updated speaker model is the final result of the speaker indexing.

Figure 7:
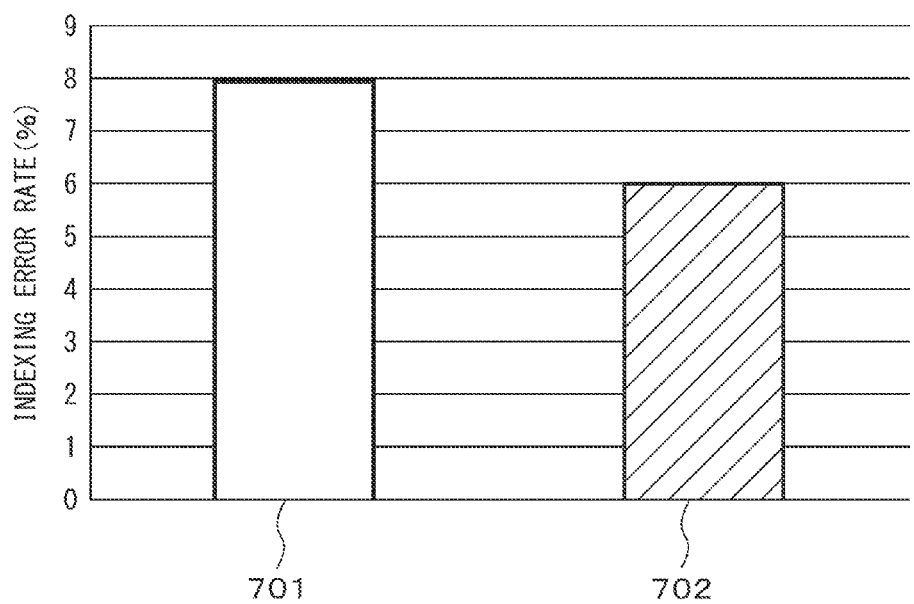
FIG. 7 is a diagram illustrating the results of an experiment which indicate speaker indexing error rates according to the present embodiment and the prior art disclosed in non-patent document 1 for comparison.

FIG. 7 is a diagram illustrating the results of experiment which indicate speaker indexing error rates according to the present embodiment and the prior art disclosed in non-patent document 1 for comparison. Since the speech data analyzed in this experiment did not contain any speech segment in which the same speaker was speaking continuously for a prolonged period of time, a segment manually created by adding up speech segments of each speaker so that the combined speech segment lasted for 10 seconds was given as an initial speaker model training data segment in the case of the prior art. On the other hand, in the case of the present embodiment, an initial speaker model training data segment having about 10 seconds in total was automatically selected in accordance with the process performed by the initial speaker model selecting unit.

In FIG. 7, the error rate is plotted along the ordinate. Graph 701 indicates the error rate according to the prior art, and graph 702 indicates the error rate according to the present embodiment. The error rates were each calculated by dividing the number of frames for which the speaker was incorrectly identified by the number of frames in which one particular speaker was speaking and by multiplying the quotient by 100. These frames do not include any frame in which two speakers were speaking simultaneously. As can be seen from the graphs 701 and 702, the error rate was about 8% in the prior art, on the other hand, the error rate was about 6% in the present embodiment. In this way, even when the speech signal does not contain any speech segment in which one particular speaker is speaking continuously for a prolonged period of time, the speaker indexing device according to the present embodiment can append the speaker identification information to each frame with an accuracy comparable to the accuracy that the prior art could achieve when the initial speaker model training data was given manually.

As has been described above, the speaker indexing device models the distribution of the feature sets extracted on a frame-by-frame basis by a mixture model having as many probability distributions as there are speakers. Then, for each probability distribution, the speaker indexing device selects the feature sets located within a predetermined distance from the center of the probability distribution as the feature sets highly likely to represent the speech of the speaker corresponding to the probability distribution. The speaker indexing device trains the initial speaker model by using one of the features extracted from the frame corresponding to the selected feature sets. Accordingly, the speaker indexing device can generate an appropriate initial speaker model even in the case of a speech signal that does not contain any relatively long speech segment for each speaker. As a result, the speaker indexing device can accurately append the speaker identification information to each frame.

According to a modified example, instead of modeling the distribution of feature sets each including integrated power value and pitch frequency, the modeling unit 22 may model the distribution of other feature sets by a mixture distribution. For example, the modeling unit 22 may model the distribution of feature sets, each including integrated power value and cepstrum norm, by a mixture distribution. Further, the feature set used by the modeling unit 22 may include the features used by the initial speaker model training unit 24, the speaker labeling unit 25, and the retraining unit 26. For example, when the feature set used by the modeling unit 22 includes the integrated power value and the pitch frequency, the feature set used by the initial speaker model training unit 24, the speaker labeling unit 25, and the retraining unit 26 may also include the integrated power value and the pitch frequency.

When the number of speakers participating in the conversation recorded in the digitized speech signal is three, the modeling unit 22 may model the distribution of feature sets each including three kinds of features by a mixture distribution so that the distribution of feature sets can be modeled by a probability distribution for each speaker. In this case, the modeling unit 22 may take the integrated power value, the pitch frequency, and the cepstrum norm as the set of features.

The cepstrum norm is calculated in accordance with the following equation.

$$norm_t = \sqrt{\sum_{i=1}^{3} Cep_t(i)^2} \quad (5)$$

where $norm_t$ is the cepstrum norm for frame t, and $Cep_t(i)$ is the ith order cepstrum coefficient for frame t.

In the above case, since the feature set includes three kinds of features, and hence there are three values, the initial training data selecting unit 23 obtains the Mahalanobis' generalized distance corresponding to the predetermined cumulative probability in accordance with a $\chi$-squared distribution with three degrees of freedom. For example, when the predetermined cumulative probability is 10%, the Mahalanobis' generalized distance is 0.5844. Then, for each probability distribution contained in the mixture distribution, the initial training data selecting unit 23 selects any feature set whose Mahalanobis' generalized distance from the center of the probability distribution is 0.5844 or less.

In the above example, since the number of speakers is three, the speaker labeling unit 25 appends speaker identification information on a frame-by-frame basis by using a Viterbi algorithm based on a three-state HMM.

Next, a speaker indexing device according to a second embodiment will be described. The speaker indexing device according to the second embodiment estimates the number of speakers from a speech signal in which the number of participating speakers is unknown, and appends speaker identification information to each frame of the speech signal, based on the estimated number of speakers.

Figure 8:
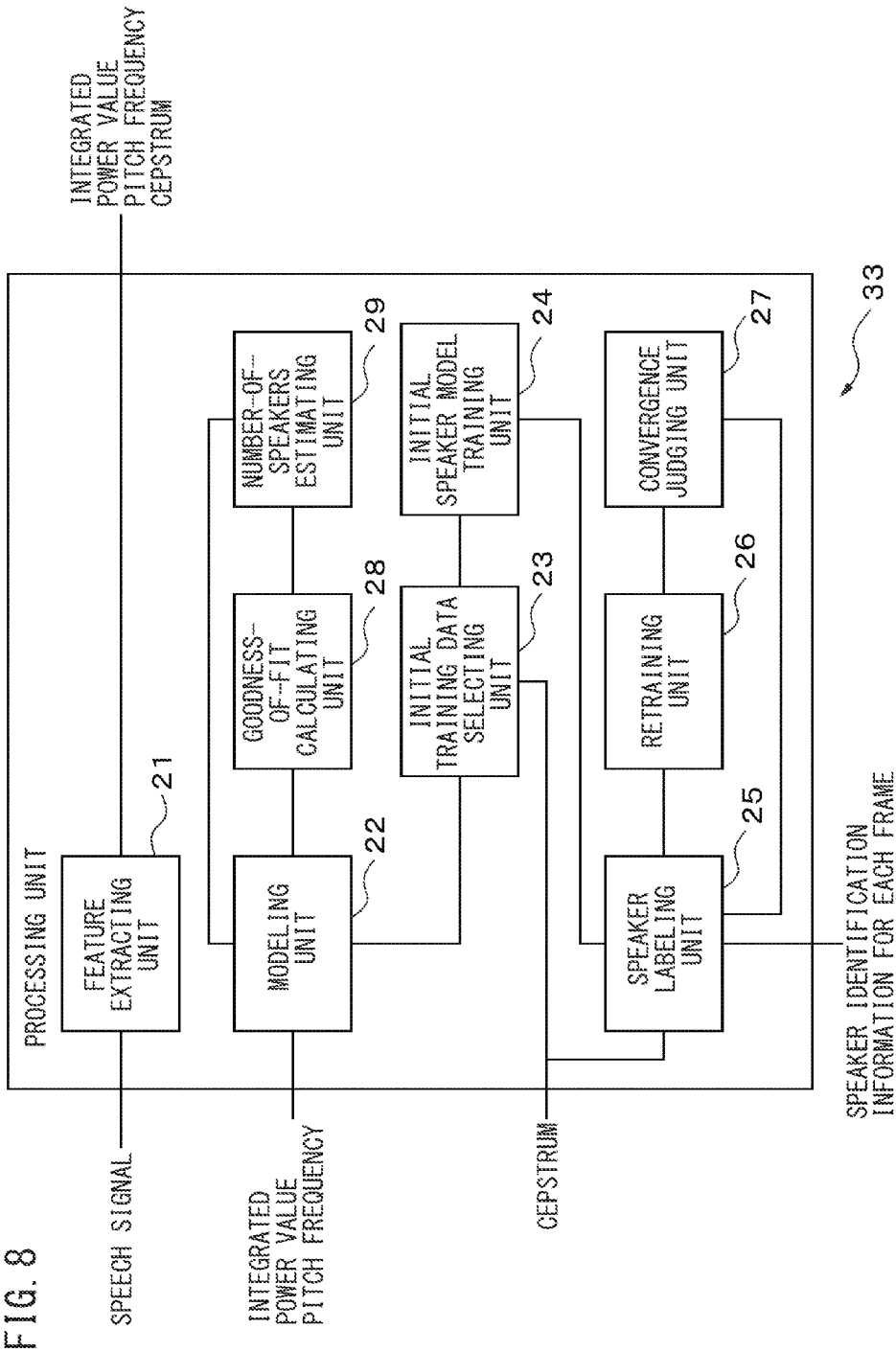
FIG. 8 is a functional block diagram of a processing unit according to a second embodiment.

FIG. 8 is a functional block diagram of a processing unit 33 in the speaker indexing device according to the second embodiment. The processing unit 33 includes a feature extracting unit 21, a modeling unit 22, an initial training data selecting unit 23, an initial speaker model training unit 24, a speaker labeling unit 25, a retraining unit 26, a convergence judging unit 27, a goodness-of-fit calculating unit 28, and a number-of-speakers estimating unit 29. The processing unit 33 according to the second embodiment differs from the processing unit 13 according to the first embodiment by the inclusion of the goodness-of-fit calculating unit 28 and the number-of-speakers estimating unit 29 and in the processing performed by other component elements in relation to the number of speakers. The following therefore describes the goodness-of-fit calculating unit 28 and the number-of-speakers estimating unit 29 and the processing performed by other component elements in relation to the number of speakers. For the other component elements of the speaker indexing device according to the second embodiment, refer to the description earlier given of the corresponding component elements of the speaker indexing device according to the first embodiment.

The modeling unit 22 first models the distribution of the feature sets extracted from each frame by a mixture distribution with two mixtures. Then, each time an instruction for increasing the number of mixtures by one is received from the number-of-speakers estimating unit 29, the modeling unit 22 models the distribution of the feature sets extracted from each frame by a mixture distribution with the increased number of mixtures. Each time the distribution of the feature sets extracted from each frame is modeled, the modeling unit 22 stores in the storage unit 14 the parameters (i.e., the maximum likelihood estimates of the weighting factor $w_i$, the mean vector $\mu_i$, and the covariance matrix $\Sigma_i$ for each distribution) describing the mixture distribution used for the modeling.

The goodness-of-fit calculating unit 28 calculates the goodness of fit that represents the degree to which the mixture distribution modeling the distribution of the feature sets fits the distribution of the feature sets.

In the present embodiment, the goodness-of-fit calculating unit 28 calculates the goodness of fit by calculating the value of Akaike's Information Criterion (AIC). The value of AIC is calculated by the following equation.

$$AIC = -2 \ln(L) + 2k \quad (6)$$

where L is the maximum likelihood (for example, the likelihood for the feature samples used for modeling, after modeling the feature samples by a probability distribution using the EM algorithm). On the other hand, k is the number of free parameters in the model, and the number increases as the number of probability distributions contained in the mixed distribution increases. For example, when a Gaussian mixture distribution or a log-normal mixture distribution is used as the mixed distribution, parameters such as the weighting factor, mean vector, and covariance matrix are needed in order to define each probability distribution. Therefore, as the number of probability distributions increases by one, k increases by the number of parameters.

The goodness-of-fit calculating unit 28 may calculate the goodness of fit by calculating the Bayesian Information Criterion (BIC) rather than calculating the AIC. The BIC is calculated by the following equation.

$$BIC = -2 \ln(L) + k \ln(m) \quad (7)$$

where L is the maximum likelihood (as in the equation (6), the likelihood for the feature samples used for modeling, after modeling the feature samples by a probability distribution using the EM algorithm), and k is the number of free parameters. On the other hand, m represents the sample size, i.e., the number of feature sets (the number of frames) used as training samples.

The goodness-of-fit calculating unit 28 stores the goodness of fit in the storage unit 14 by associating it with the corresponding number of speakers.

The number-of-speakers estimating unit 29 estimates the number of speakers based on the goodness of fit. In the present embodiment, AIC or BIC is calculated to calculate the goodness of fit, which means that the distribution of feature sets can be best modeled by a mixture distribution with the number of mixtures that minimizes the goodness of fit. Therefore, the number-of-speakers estimating unit 29 estimates that the number of mixtures that minimizes the goodness of fit represents the number of speakers.

For example, the number-of-speakers estimating unit 29 makes a comparison between the goodness of fit before increasing the number of mixtures in the mixture distribution used for modeling the feature sets and the goodness of fit after the number of mixtures in the mixture distribution is increased. If the goodness of fit before increasing the number of mixtures is larger, the number-of-speakers estimating unit 29 determines that the number of mixtures is to be increased by one, and notifies the modeling unit 22 accordingly.

On the other hand, if the goodness of fit after the number of mixtures is increased is not smaller than the goodness of fit before increasing the number of mixtures, the numberof-speakers estimating unit 29 estimates that the goodness of fit before increasing the number of mixtures represents the number of speakers participating in the conversational speech contained in the speech signal. Then, the number-of-speakers estimating unit 29 passes the estimated number of speakers to the initial training data selecting unit 23, the initial speaker model training unit 24, the speaker labeling unit 25, and the retraining unit 26.

The initial training data selecting unit 23 reads the storage unit 14 to retrieve the parameters describing the mixture distribution having as many mixtures as the estimated number of speakers. Then, for each probability distribution contained in the mixture distribution, the initial training data selecting unit 23 selects the feature sets located within a predetermined distance from the center of the probability distribution, and passes the features of the frame corresponding to the selected feature sets to the initial speaker model training unit 24.

Using the features of the frame selected for each probability distribution, the initial speaker model training unit 24 trains the initial speaker model for each of the estimated number of speakers. In this embodiment also, the initial speaker model training unit 24 can train the initial speaker model by using, for example, the EM algorithm. In this embodiment also, the initial speaker model of each speaker is represented, for example, by a mixture distribution with eight mixtures.

Based on the most recent speaker model of each speaker, the speaker labeling unit 25 appends speaker identification information on a frame-by-frame basis by using a Viterbi algorithm based on an HMM having as many states as the estimated number of speakers.

For each of the estimated number of speakers, the retraining unit 26 retrains the speaker model by using the features of the frame corresponding to the speaker. In this embodiment also, the retraining unit 26 can train the speaker model by using the EM algorithm.

FIG. 9 is an operation flowchart of a number-of-speakers estimating process. The processing unit 33 performs the number-of-speakers estimating process in accordance with this operation flowchart instead of the process of step S102 in the operation flowchart of the speaker indexing process according to the first embodiment.

After the feature sets have been extracted from each frame of the speech signal, the modeling unit 22 sets the number, N, of mixtures in the mixture distribution used for the distribution of feature sets to 2 (step S201). Then, the modeling unit 22 models the distribution of feature sets in each frame by a mixture distribution with the number, N, of mixtures (step S202).

The goodness-of-fit calculating unit 28 calculates the goodness of fit G(N) for the mixture distribution with the number, N, of mixtures (step S203). Then, the number-of-speakers estimating unit 29 determines whether the goodness of fit G(N) is either equal to or larger than the goodness of fit G(N−1) calculated for the mixture distribution with the number, (N−1), of mixtures (step S204). However, in the case of N=2, since the goodness of fit for N=1 is not calculated, the number-of-speakers estimating unit 29 assumes that G(N) is smaller than G(N−1).

If G(N) is smaller than G(N−1) (No in step S204), the number-of-speakers estimating unit 29 instructs the modeling unit 22 to increase the number, N, of mixtures by one (step S205). Then, the processing unit 33 repeats the process starting from step S202. On the other hand, if G(N) is either equal to or larger than G(N−1) (Yes in step S204), the number-of-speakers estimating unit 29 estimates that the number of speakers participating in the conversation recorded in the speech signal is (N−1) (step S206). After that, the processing unit 33 proceeds to perform the process starting from step S103.

According to the present embodiment, the speaker indexing device can appropriately append speaker identification information to each frame of the speech signal even when the number of speakers participating in the conversation recorded in the speech signal is not known in advance.

According to a modified example, the number-of-speakers estimating unit 29 may estimate the number of speakers participating in the conversation by using some other number-of-speakers estimating method. For example, the number-of-speakers estimating unit 29 may cluster the feature sets extracted from each frame by using genetic algorithms or the like, as disclosed by Daben Liu et al., in "ONLINE SPEAKER CLUSTERING", in Proceedings of ICASSP 2004, Vol. 1, pp. 333-336, 2004. Then, the number-of-speakers estimating unit 29 may take the number of obtained clusters as the number of speakers. In this case, the modeling unit 22 models the distribution of the feature sets extracted from each frame by a probability distribution having as many mixtures as the number of speakers estimated by the number-of-speakers estimating unit 29. In this modified example, the goodness-of-fit calculating unit 28 may be omitted since there is no need to calculate the goodness of fit.

The speaker indexing device according to any one of the above embodiments or modified examples may be incorporated in a server/client system.

FIG. 10 is a diagram schematically illustrating the configuration of a server/client system incorporating the speaker indexing device according to any one of the above embodiments or their modified examples. The server/client system 100 includes a terminal 110 and a server 120, and the terminal 110 and the server 120 can communicate with each other via a communication network 130. The server/client system 100 may include more than one terminal 110. Likewise, the server/client system 100 may include more than one server 120.

The terminal 110 includes a speech input unit 111, a storage unit 112, a communication unit 113, and a control unit 114. The speech input unit 111, the storage unit 112, and the communication unit 113 are each connected to the control unit 114, for example, via a bus.

The speech input unit 111 includes, for example, an audio interface and an A/D converter. The speech input unit 111 acquires an analog speech signal containing conversational speech, for example, from a telephone line, and digitizes the speech signal by sampling the speech signal at a predetermined sampling rate. The speech input unit 111 passes the digitized speech signal to the control unit 114.

The storage unit 112 includes, for example, a nonvolatile semiconductor memory and a volatile semiconductor memory. The storage unit 112 stores a computer program for controlling the terminal 110, identification information for identifying the terminal 110, and various kinds of data and computer programs, etc. to be used in the speaker indexing process.

The communication unit 113 includes an interface circuit for connecting the terminal 110 to the communication network 130. The communication unit 113 receives feature sets from the control unit 114 and transmits them via the communication network 130 to the server 120 together with the identification information of the terminal 110.

The control unit 114 includes one or a plurality of processors and their peripheral circuitry. Of the various functions of the processing unit according to any one of the above embodiments or modified examples, the control unit 114 implements the function of the feature extracting unit 21. More specifically, the control unit 114 divides the speech signal into frames, and extracts two or more kinds of features representing human speech features from each frame. Then, the control unit 114 passes the set of features extracted from each frame to the communication unit 113 which transmits the set of features together the identification information of the terminal 110 to the server 120 via the communication network 130.

The server 120 includes a communication unit 121, a storage unit 122, and a processing unit 123. The communication unit 121 and the storage unit 122 are each connected to the processing unit 123 via a bus.

The communication unit 121 includes an interface circuit for connecting the server 120 to the communication network 130. The communication unit 121 receives the set of features of each frame and the identification information of the terminal 110 from the terminal 110 via the communication network 130 and passes them to the processing unit 123.

The storage unit 122 includes, for example, a nonvolatile semiconductor memory and a volatile semiconductor memory. The storage unit 122 stores a computer program for controlling the server 120, etc. The storage unit 122 may further store a computer program for executing the speaker indexing process and the set of features for each frame received from each terminal.

The processing unit 123 includes one or a plurality of processors and their peripheral circuitry. Of the various functions of the processing unit in the speaker indexing device according to any one of the above embodiments or modified examples, the processing unit 123 implements the function of each unit other than the feature extracting unit 21. More specifically, the processing unit 123 appends speaker identification information to each frame from the set of features received from the terminal 110 on a frame-by-frame basis. Then, using the speaker identification information appended to each frame, for example, the processing unit 123 extracts any frame containing vocal utterance made by one particular speaker. The processing unit 123 may then estimate the state of mind of the particular speaker from the extracted frame by using a method that estimates a speaker's state of mind based on a speech signal. For example, if the state of mind of that particular speaker is abnormal, the processing unit 123 may determine that some malicious conversation such as a bank transfer fraud is being conducted over the telephone, and may cause the communication unit 121 to transmit the identification information of the terminal 110 to a security system (not depicted) together with a notification that some malicious conversation is being conducted over the telephone. This enables the operator of the security system to provide appropriate support to the user of the terminal 110.

According to the present embodiment, each individual terminal 110 need only extract a set of features on a frame-by-frame basis from a speech signal produced by recording a conversation and transmit the extracted features to the server 120. Alternatively, the terminal 110 may transmit the speech signal itself to the server 120. In this case, the processing unit 123 in the server 120 implements each function of the processing unit in the speaker indexing device according to any one of the above embodiments or modified examples.

A computer program for causing a computer to implement each function of the processing unit in the speaker indexing device according to any one of the above embodiments or their modified examples may be provided in the form recorded on a computer readable medium such as a magnetic recording medium or an optical recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A speaker indexing device comprising:
a processor configured to:
from a speech signal containing a conversation between a plurality of speakers, extract at least one feature and a data set including at least two values on a frame-by-frame basis, each frame having a predetermined time length, the at least one feature and the data set representing human speech features;
model a distribution of the data set extracted for each frame, by a mixture distribution that contains as many probability distributions as the number of speakers;
for each of the probability distributions, select from among the data set extracted for each frame, either data sets located within a predetermined distance from the center of the probability distribution or a predetermined number of data sets in sequence starting from the data set closest to the center of the probability distribution, and select the at least one feature extracted for the frame corresponding to each selected data set, as first training data for speaker of the plurality of speakers that corresponds to the probability distribution;
train a speaker model for each of the plurality of speakers by using the first training data selected for the corresponding speaker, the speaker model representing the speech features of the speaker by a probability distribution of the at least one feature; and
based on the speaker model of each of the plurality of speakers and on the at least one feature for each frame, append to each frame identification information for identifying the speaker speaking in the frame.

2. The speaker indexing device according to claim 1, wherein the processor is further configured to:
update the speaker model for each of the plurality of speakers by training the speaker model by using as second training data the at least one feature for each frame to which the identification information of the corresponding speaker has been appended; and
determine whether the training of the speaker model has converged or not and, when the training has not converged yet, append the identification information to each frame based on the updated speaker model and on the at least one feature for the frame and update the speaker model.

3. The speaker indexing device according to claim 1, wherein the selecting the data sets changes, when any one of the data set extracted for each frame is located within the predetermined distance from the centers of two or more of the probability distributions, the predetermined distance for each of the two or more probability distributions to a distance measured from the center of the probability distribution to the data set which is located within the predetermined distance from the centers of two or more of the probability distributions and select, for each of the two or more probability distributions, any data set that is located within the changed predetermined distance from the center of the probability distribution.

4. The speaker indexing device according to claim 1, wherein the predetermined distance is a Mahalanobis' generalized distance corresponding to a predetermined cumulative probability in a $\chi$-squared distribution with degrees of freedom equal to the number of values contained in the data set.

5. The speaker indexing device according to claim 1, wherein the processor is further configured to estimate the number of speakers based on the distribution of the data set extracted for each frame.

6. The speaker indexing device according to claim 1, wherein the data set includes an integrated power value and a pitch frequency of the speech signal for each frame, and the at least one feature includes a cepstrum of the speech signal for each frame.

7. A speaker indexing method comprising:
extracting, by a processor, from a speech signal containing a conversation between a plurality of speakers, at least one feature and a data set including at least two values on a frame-by-frame basis, each frame having a predetermined time length, the at least one feature and the data set representing human speech features;
modeling, by the processor, a distribution of the data set extracted for each frame, by a mixture distribution that contains as many probability distributions as the number of speakers;
selecting, by the processor, for each of the probability distributions, from among the data set extracted for each frame, either data sets located within a predetermined distance from the center of the probability distribution or a predetermined number of data sets in sequence starting from the data set closest to the center of the probability distribution, and selecting, the at least one feature extracted for the frame corresponding to each selected data set, as first training data for speaker of the plurality of speakers that corresponds to the probability distribution;
training, by the processor, a speaker model for each of the plurality of speakers by using the first training data selected for the corresponding speaker, the speaker model representing the speech features of the speaker by a probability distribution of the at least one feature; and
appending to each frame, by the processor, identification information for identifying the speaker speaking in the frame based on the speaker model of each of the plurality of speakers and on the at least one feature for each frame.

8. The speaker indexing method according to claim 7, further comprising:
updating, by the processor, the speaker model for each of the plurality of speakers by training the speaker model by using as second training data the at least one feature for each frame to which the identification information of the corresponding speaker has been appended;
determining whether the training of the speaker model has converged or not, by the processor; and
when the training has not converged yet, appending the identification information to each frame based on the updated speaker model and on the at least one feature for the frame and updating the speaker model, by the processor.

9. The speaker indexing method according to claim 7, wherein the selecting the data sets changes, when any one of the data set extracted for each frame is located within the predetermined distance from the centers of two or more of the probability distributions, the predetermined distance for each of the two or more probability distributions to a distance measured from the center of the probability distribution to the data set which is located within the predetermined distance from the centers of two or more of the probability distributions and select, for each of the two or more probability distributions, any data set that is located within the changed predetermined distance from the center of the probability distribution.

10. The speaker indexing method according to claim 7, wherein the predetermined distance is a Mahalanobis' generalized distance corresponding to a predetermined cumulative probability in a $\chi$-squared distribution with degrees of freedom equal to the number of values contained in the data set.

11. The speaker indexing method according to claim 7, further comprising:
estimating, by the processor, the number of speakers based on the distribution of the data set extracted for each frame.

12. The speaker indexing method according to claim 7, wherein the data set includes an integrated power value and a pitch frequency of the speech signal for each frame, and the at least one feature includes a cepstrum of the speech signal for each frame.

13. A non-transitory computer-readable recording medium having recorded thereon a speaker indexing computer program that causes a computer to execute a process comprising:
from a speech signal containing a conversation between a plurality of speakers, extracting at least one feature and a data set including at least two values on a frame-by-frame basis, each frame having a predetermined time length, the at least one feature and the data set representing human speech features;
modeling a distribution of the data set extracted for each frame, by a mixture distribution that contains as many probability distributions as the number of speakers;
for each of the probability distributions, selecting from among the data set extracted for each frame, either data sets located within a predetermined distance from the center of the probability distribution or a predetermined number of data sets in sequence starting from the data set closest to the center of the probability distribution, and selecting the at least one feature extracted for the frame corresponding to each selected data set, as first training data for speaker of the plurality of speakers that corresponds to the probability distribution;
training a speaker model for each of the plurality of speakers by using the first training data selected for the corresponding speaker, the speaker model representing the speech features of the speaker by a probability distribution of the at least one feature; and
based on the speaker model of each of the plurality of speakers and on the at least one feature for each frame, appending to each frame identification information for identifying the speaker speaking in the frame.

* * * * *